Dec. 5, 1933.  J. J. CRAWFORD  1,938,173
PROCESS FOR THE EXTRACTION OF ALUMINA FROM ALUMINOUS MATERIALS
Filed Feb. 16, 1931
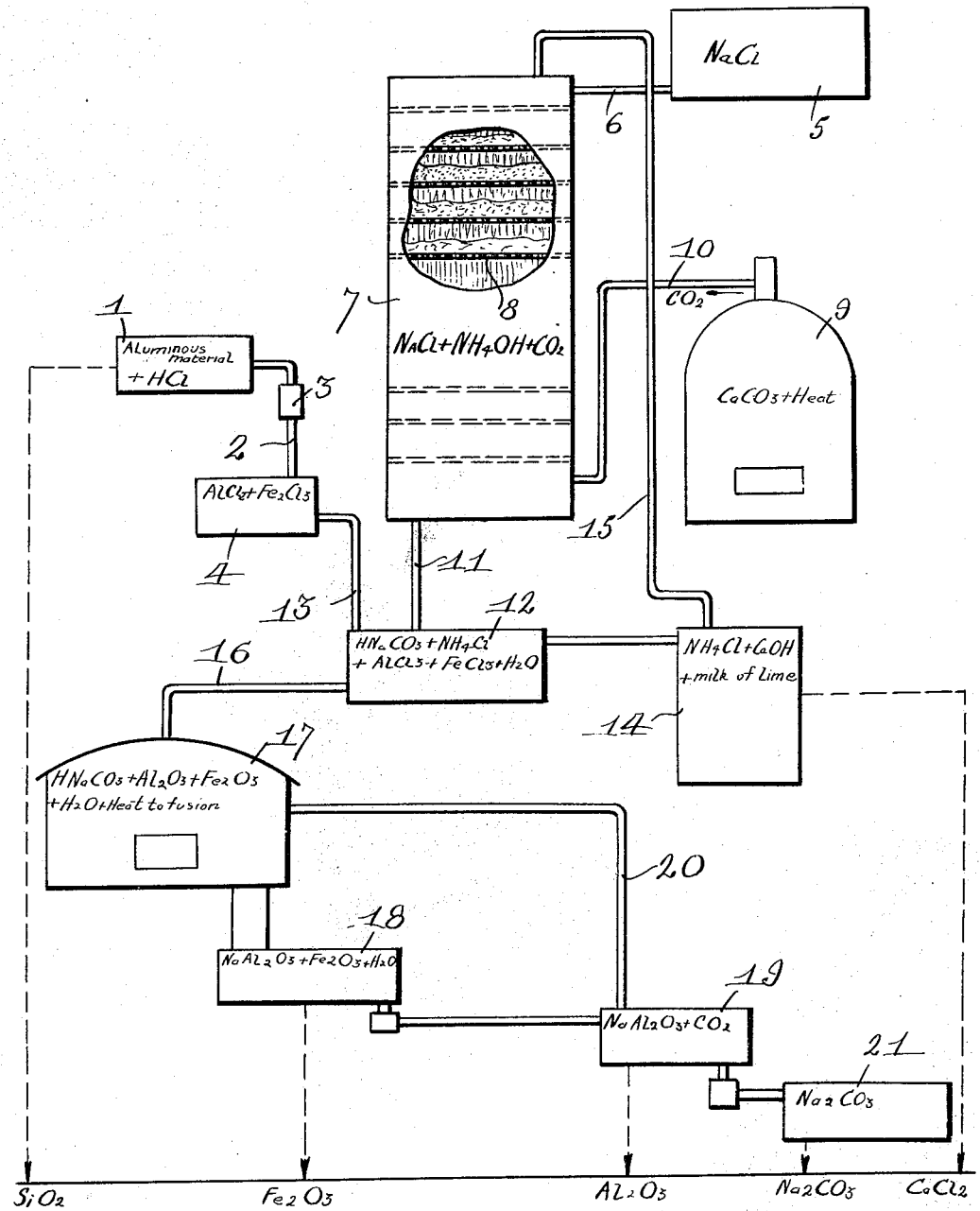
John J. Crawford, Inventor Patented Dec. 5, 1933

1,938,173

UNITED STATES PATENT OFFICE 1,938,173

PROCESS FOR THE EXTRACTION OF ALUMINA FROM ALUMINOUS MATERIALS

John James Crawford, New Glasgow, Nova Scotia, Canada

Application February 16, 1931. Serial No. 516,177

7 Claims. (Cl. 23—143)

The present invention relates to a process for the extraction of alumina from aluminous material and has for its primary object the provision of a process whereby alumina can be extracted from aluminous material such as bauxite, shale, clay, feldspar and the like in a substantially more economical and efficient manner than that of the processes heretofore commonly employed for such extraction.

A further object of the invention is the provision of a process of the above character which will enable the use of relatively abundant and inexpensive materials in the practice thereof.

Another object of the invention is the provision of a process of the above character wherein the metal extracted will be in an unusually pure state.

Still another object of the invention is the provision of a process of the above character which will enable the recovery of a relatively large percentage of sodium aluminate.

Other objects and advantages of the invention will become apparent as the description progresses.

In the accompanying drawing forming a part of this specification and in which like reference characters are employed to designate corresponding parts throughout the same:

The figure is a diagrammatic illustration of an apparatus which may be employed in carrying out the present process.

In carrying out the process, particularly in connection with the apparatus shown in the accompanying drawing, a quantity of aluminous material is initially subjected to dissolution with hydrochloric acid, or equivalent dissolving agent, in a tank indicated at 1. The silica and insoluble matter is thereafter settled out or filtered.

The filtrate is then conducted, through a conducting pipe 2 and through a filter 3, in the form of an aluminium chloride and other chloride solutions into a receiving reservoir 4.

A quantity of common salt, sodium chloride, is separately dissolved to form a brine in a container 5 and is conducted, through a pipe 6, into a receiving vessel 7.

The vessel 7 is provided with a plurality of horizontal superposed perforated partitions or shelves 8 and contains an excess of ammonia.

Carbon dioxide gas is generated in the lime kiln 9, connected with the lower end of the vessel 7 through a pipe 10. The carbon dioxide gas is thus conducted from the lime kiln 9 to the lower portion of the vessel 7 and combines with the sodium of the salts discharged into the vessel so as to form an acid of sodium bicarbonate which, being insoluble in ammonia, settles out and is conducted from the vessel 7, through a pipe 11, into a tank 12 in the form of a sludge.

The aluminium chloride and other chloride solutions are conducted, through a pipe 13, into the receiving tank 12 wherein the chlorine will be caused to combine with ammonia, also introduced into the tank, to form ammonium chloride. The alumina and other elements such as iron, gold, glucinia present therein will be precipitated as aluminium iron and other hydroxides.

The ammonium chloride solution is transferred from the tank 12 into a container 14, having deposited therein milk of lime and forming in this tank calcium chloride. The ammonia liberated in the container 14 is conducted to the upper end portion of the vessel 7 through the medium of a pipe 15 for repeated use in this vessel.

The residual sludge in the receiving tank 12 consisting of bicarbonate of soda, aluminium, and other hydroxides is transferred, through a conducting pipe 16 into a furnace 17, wherein it is heated to the fusion point causing the bicarbonate of soda to liberate hydrogen and carbon dioxide. The sodium of the salt unites with the alumina to form sodium aluminate and iron and other oxides.

The sodium aluminate, together with the oxides present are transferred to a dissolving tank 18, subjected to a water bath wherein the oxides, being insoluble in water, are filtered out. The filtrate, sodium aluminate, is conducted to a container 19. Carbon dioxide is also discharged into the container 19 through a pipe 20 connecting the container with the furnace 17, causing precipitation of aluminium oxide in the container.

The aluminium oxide is filtered out and, by evaporation of the filtrate, sodium carbonate is formed.

Through the medium of the process described in the foregoing, aluminium oxide, sodium carbonate, calcium chloride, iron, glucinium, gold and other valuable oxides and silica accompanied by other insoluble elements present may be efficiently and economically extracted from aluminous materials such as clay, shale, bauxite, cobalt, nickel ores and the like.

It is to be understood that the particular steps of the process and the apparatus illustrated are to be taken as preferred examples of the same and that various modifications may be resorted to without departing from the spirit of the invention or the scope of the subjoined claims.

Having thus described my invention, I claim:

1. A process for the extraction of alumina from aluminous material which consists in dissolving the aluminous material in hydrochloric acid, recovering the aluminium chloride and iron chloride solution and mixing the same with sodium bicarbonate, subjecting the resultant mixture of bicarbonate of soda, aluminium hydroxide and iron oxide to heat, treating the residue sodium aluminate and iron oxide to dissolve the sodium aluminate, combining carbon dioxide with the sodium aluminate, and precipitating aluminium oxide.

2. A process of treating aluminous material which consists in subjecting the aluminous material to the action of hydrochloric acid to effect dissolution, separating the undissolved matter from the solution, mixing the dissolved matter with a solution of sodium chloride, treating the mixed solution with ammonia and carbon dioxide to precipitate bicarbonate of soda and alumina and other hydroxides, heating the precipitate to fusion, dissolving soluble matter from the heated precipitate in water, recovering alumina from the solution by precipitation by the use of carbon dioxide, and recovering sodium carbonate from the remaining solution by evaporation.

3. A process of treating aluminous material which consists in subjecting the aluminous material to the action of hydrochloric acid to effect dissolution, separating the undissolved matter from the solution, mixing the dissolved matter with a solution of sodium chloride, treating the mixed solution with ammonia and carbon dioxide to precipitate bicarbonate of soda and alumina and other hydroxides, heating the precipitate to fusion, dissolving soluble matter from the heated precipitate in a water bath and recovering iron and other oxides by filtration, recovering alumina from the resulting solution by precipitation with carbon dioxide, and recovering sodium carbonate from the remaining solution by evaporation.

4. A process of treating aluminous material which consists in subjecting the aluminous material to the action of hydrochloric acid to effect dissolution, separating the undissolved matter from the solution, mixing the dissolved matter with a solution of sodium chloride, treating the mixed solution with ammonia and carbon dioxide to precipitate bicarbonate of soda and other hydroxides, heating the precipitate to fusion to form sodium aluminate and iron and other oxides, subjecting the heated precipitate to a water bath to dissolve sodium aluminate, treating the sodium aluminate solution with carbon dioxide to precipitate aluminum oxide, and recovering sodium carbonate from the remaining solution by evaporation.

5. A process of treating aluminous material which consists in subjecting the aluminous material to the action of hydrochloric acid to effect dissolution, separating the undissolved matter from the solution, mixing the dissolved matter with a solution of sodium chloride, treating the mixed solution with ammonia and carbon dioxide to precipitate bicarbonate of soda and alumina and other hydroxides, heating the precipitate thus obtained to fusion to form sodium aluminate and iron and other oxides, dissolving the sodium aluminate with water, mixing carbon dioxide with sodium aluminate solution to precipitate aluminum oxide, and subjecting the remaining solution to evaporation for recovering sodium carbonate.

6. A process of treating aluminous material which consists in subjecting the aluminous material to the action of hydrochloric acid to effect dissolution, separating the undissolved matter from the solution, mixing the dissolved matter with a solution of sodium chloride, treating the mixed solution with ammonia and carbon dioxide to precipitate bicarbonate of soda and alumina and other hydroxides, recovering ammonium chloride for treatment with milk of lime to regenerate ammonia and returning the ammonia for use in the aforesaid precipitation treatment, heating the precipitate to fusion, dissolving soluble matter from the heated precipitate in water, recovering alumina from the solution by precipitation by the use of carbon dioxide, and recovering sodium carbonate from the remaining solution by evaporation.

7. A process of treating aluminous material which consists in subjecting the aluminous material to the action of hydrochloric acid to effect dissolution, separating the undissolved matter from the solution, mixing the dissolved matter with a solution of sodium chloride, treating the mixed solution with ammonia and carbon dioxide to precipitate bicarbonate of soda and alumina and other hydroxides, recovering ammonium chloride and mixing with milk of lime to regenerate ammonia and returning the ammonia thus obtained for use in the aforesaid precipitation treatment, heating the precipitate to fusion to form sodium aluminate and iron and other oxides, dissolving the sodium aluminate in water, recovering iron and other oxides by filtration, mixing the sodium aluminate solution with carbon dioxide to precipitate aluminum oxide, and evaporating the remaining solution to recover sodium carbonate.

JOHN JAMES CRAWFORD.